(12) United States Patent
Atarashi (10) Patent No.: US 7,949,466 B2
(45) Date of Patent: May 24, 2011

(54) MAP DATA PROVIDING DEVICE (75) Inventor: Yasutaka Atarashi, Kariya (JP)

(73) Assignee: Denso Corporation, Kariya (JP)

( * ) Notice: Subject to any disclaimer, the term of this patent is extended or adjusted under 35 U.S.C. 154(b) by 1041 days.

(21) Appl. No.: 11/798,794

(22) Filed: May 17, 2007

(65) Prior Publication Data

US 2007/0271036 A1 Nov. 22, 2007

(30) Foreign Application Priority Data

May 19, 2006 (JP) ................................. 2006-139994

(51) Int. Cl.
*G01C 21/30* (2006.01)
*G06F 17/00* (2006.01)

(52) U.S. Cl. ........ 701/208; 701/207; 701/214; 340/988; 342/357.14

(58) Field of Classification Search .................. 701/207, 701/205, 209, 210, 208, 211, 213, 216, 217, 701/200, 214, 215; 340/995, 988, 995.1; 342/357.02, 357.06, 357.12, 357.14, 357.15
See application file for complete search history.

(56) References Cited

U.S. PATENT DOCUMENTS

| | | | |
|---|---|---|---|
| 5,276,451 A | 1/1994 | Odagawa | |
| 5,345,388 A | 9/1994 | Kashiwazaki | |
| 5,774,824 A * | 6/1998 | Streit et al. | 701/207 |
| 5,808,565 A * | 9/1998 | Matta et al. | 340/994 |
| 6,154,152 A | 11/2000 | Ito | |
| 6,597,987 B1* | 7/2003 | Barton | 701/213 |
| 7,024,307 B2 | 4/2006 | Ito et al. | |
| 7,580,790 B2* | 8/2009 | Jansson | 701/201 |
| 2005/0102098 A1* | 5/2005 | Montealegre et al. | 701/209 |
| 2008/0133066 A1* | 6/2008 | Takenaka | 701/1 |

FOREIGN PATENT DOCUMENTS

| | | |
|---|---|---|
| JP | A-11-351890 | 12/1999 |
| JP | A-2001-174267 | 6/2001 |
| JP | A-2004-309152 | 11/2004 |

* cited by examiner

*Primary Examiner* — Ronnie Mancho
(74) *Attorney, Agent, or Firm* — Posz Law Group, PLC (57) ABSTRACT

Vehicular swept path data and electronic map data representing a road map are compared with each other to compute correction information that represents the amount of deviation of the electronic map data from the vehicular swept path data with respect to each predetermined block. The electronic map data is corrected using the computed correction information, and the corrected electronic map data is provided.

11 Claims, 7 Drawing Sheets

MAP DATA PROVIDING DEVICE

CROSS REFERENCE TO RELATED APPLICATION

This application is based on and incorporates herein by reference Japanese Patent Application No. 2006-139994 filed on May 19, 2006.

FIELD OF THE INVENTION

The present invention relates to a map data providing device that provides map data to an in-vehicle unit that operates using map data.

BACKGROUND OF THE INVENTION

In recent years, consideration has been given to linkage between an automobile navigation system and vehicle control. For example, propositions have been made to control the direction of projection of light from the headlamps of a vehicle based on curve information acquired from map data in an automobile navigation system. When vehicle control is carried out according to road conditions based on map data in an automobile navigation system, as mentioned above, it is required to enhance the accuracy of the map data. Meanwhile, a system has been proposed for the maintenance of road data retained at a central facility so constructed as to retain road data. (Refer to Patent Document 1, for example.)

Patent Document 1: JP-B1-3496479 (U.S. Pat. No. 6,154,152)

However, the system disclosed in Patent Document 1 involves a problem. This system is intended to add new non-retained road data different from retained road data accumulated at a central facility, and it is not intended to update retained road data itself already retained at a central facility. For this reason, the accuracy of existing road data cannot be enhanced.

SUMMARY OF THE INVENTION

In consideration with the above problem, it is an object of the invention to make it possible to provide more accurate map data.

According to an aspect of the present invention, a map data providing device is provided as follows. A vehicle position detecting unit is configured to detect an absolute position of a vehicle. A storing unit is configured to store absolute positions of the vehicle detected by the vehicle position detecting unit while the vehicle runs as vehicular swept path data pertaining to the vehicle. A correction information computing unit is configured to compare the vehicular swept path data with electronic map data representing a road map and compute correction information representing an amount of deviation of the electronic map data from the vehicular swept path data with respect to each predetermined block. A first correcting unit is configured to correct the electronic map data using the correction information computed by the correction information computing unit. A first map data providing unit is configured to provide the electronic map data corrected by the first correcting unit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
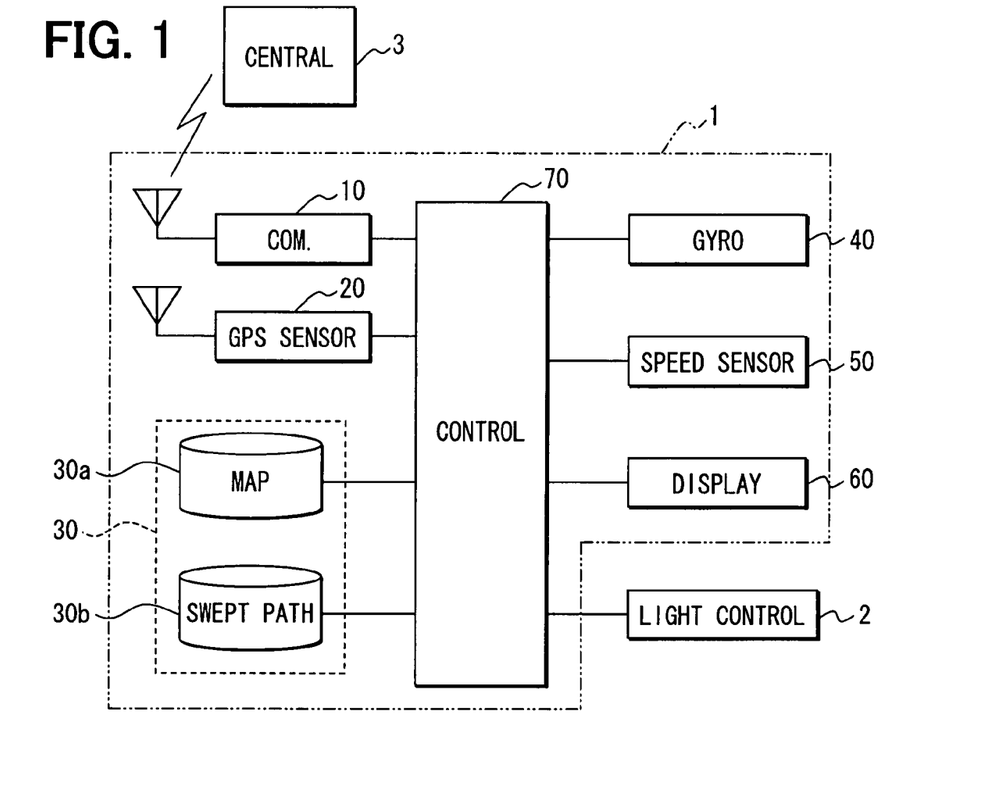
FIG. 1 is a drawing illustrating the configuration of a map data providing device in a first embodiment of the invention.

FIG. 1 illustrates the configuration of a map data providing device in a first embodiment of the invention. The map data providing device in this embodiment is constructed as an automobile navigation system 1.

The automobile navigation system 1 includes a communication unit 10, a GPS sensor 20, a storage unit 30, a gyro sensor 40, a vehicle speed sensor 50, a display unit 60, and a control unit 70. The control unit 70 is connected with a light control unit 2 that changes the direction of the light axis of a headlamp using map data provided from the automobile navigation system 1.

The communication unit 10 communicates with an external source through a radio communication line, and is so constructed that it can communicate data between it and an central facility 3 connected through the radio communication line.

The central facility 3 has a function of managing map data used in the automobile navigation system 1, and maintains map data and performs other similar processing. The central facility 3 is also provided with a function of receiving information transmitted from multiple vehicles equipped with the same automobile navigation system 1 as in this embodiment, and storing it on storage media.

The GPS sensor 20 receives radio waves transmitted from artificial satellites for GPS (Global Positioning System) and detects the absolute position (latitude, longitude, and altitude) of a vehicle. The detection of the absolute position of the vehicle by the GPS sensor 20 is periodically carried out.

The storage unit 30 is a storage medium for storing varied information and is so constructed that varied information can be written to and read from it. The storage unit 30 in this embodiment is constructed of a hard disk drive (HDD). The storage unit 30 may be so constructed that map data is read from a magnetic disk, such as a flexible disk, a magneto-optical disk, or transportable storage media, such as semiconductor memory.

The storage unit 30 stores an electronic map database 30a in which electronic map data representing a road map is stored. For this electronic map data, the reliability of map data that indicates the accuracy of map data is preset with respect to each predetermined section. With respect to the electronic map data in this embodiment, the reliability of the electronic map data is defined using plane position standard deviation that indicates an error in plane position observed during surveying for electronic map data. Specifically, letting the plane position standard deviation be σ and a coefficient be β, the reliability R1 of the electronic map data is defined as R1=1/(1+βσ). That is, the reliability R1 of the electronic map data is increased with decrease in plane position standard deviation σ, and is decreased with increase in plane position standard deviation σ.

The storage unit 30 in this embodiment stores a vehicular swept path database 30b in which the absolute position of the vehicle, plotted and accumulated as vehicular swept path data as the vehicle is running, is stored. The vehicular swept path information is an aggregate obtained by collecting and storing the absolute position (latitude, longitude, and altitude) of a vehicle at predetermined intervals in a specific section on a road map represented by map data, and is stored in correlation with map data. The vehicular swept path information includes information pertaining to the accuracy with which the absolute position of a vehicle is detected.

Positioning by GPS has an index designated as HDOP (Horizontal Dilution Of Precision) that represents degradation in accuracy in the horizontal direction, caused by the distribution of artificial satellites for GPS. A low HDOP indicates high accuracy, and a high HDOP indicates low accuracy.

The vehicular swept path information is generated using an absolute position detected by the GPS sensor 20. In this embodiment, therefore, the reliability of vehicular swept path information is defined on a mesh-by-mesh basis using this HDOP. Specifically, letting a coefficient be α, the reliability R2 of vehicular swept path information is defined as R2=1/(1+αHDOP). That is, when the accuracy of GPS positioning is high and the HDOP is low, the reliability R2 of vehicular swept path information is high, and the reliability R2 is lowered with decrease in the accuracy of GPS positioning and increase in HDOP.

The gyro sensor (angular velocity sensor) 40 is used to detect the direction in which the vehicle is running, and outputs a detection signal corresponding to the angular velocity of rotary motion applied to the vehicle. The vehicle speed sensor 50 outputs a pulse signal at intervals corresponding to the running speed of the vehicle. The display unit 60 is for displaying varied information, such as a road map represented by map data, and is constructed of, for example, a liquid crystal display.

The control unit 70 is constructed based on a microcomputer having CPU, ROM, RAM, I/O, a bus line that connects them, and the like, and controls the above-mentioned units 10 to 60 in a centralized manner. The control unit 70 carries out, for example, the following processing: the processing of detecting the absolute position of the vehicle based on detection signals from the GPS sensor 20, gyro sensor 40, and vehicle speed sensor 50; the map matching processing of correcting the position of the vehicle so that it is matched with a road map represented by map data stored in the storage unit 30; the processing of causing the display unit 60 to display a road map represented by map data and the position of the vehicle that underwent map matching processing; the processing of presenting the optimum driving route from the absolute position of the vehicle to a destination; the vehicular swept path information collecting processing of storing the absolute position, detected by the GPS sensor 20, in the storage unit 30 as vehicular swept path information 30b; the processing of computing HDOP; and the like.

The light control unit 2 is constructed as a microcomputer having CPU, ROM, RAM, I/O, a bus line that connects them, and the like. Based on map data sent from the control unit 70, the light control unit 2 carries out control to change the directions of the light axes of headlamps provided at the left and right front parts of the vehicle (light axis control). For example, the following operation is carried out by this control: when a right curve exists ahead of the running vehicle, the light axes of the headlamps are shifted to the right; when a left curve exists ahead of the running vehicle, the light axes of the headlamps are shifted to the left.

Since the electronic map data is generated by measuring a distance, there are less relative errors. However, if a control point is erroneously set, the entire electronic map data becomes deviated. The present inventors focus attention on this regard, and have conceived that if deviation of a control point in electronic map data is corrected using information on an accurately detected position, the data will be usable as accurate map data.

A description will be given of the processing of computing correction information carried out by the control unit 70. The correction information represents an amount of deviation between electronic map data and vehicular swept path data. The control unit 70 computes the correction information by comparing electronic map data and vehicular swept path data with each other.

Figure 2:
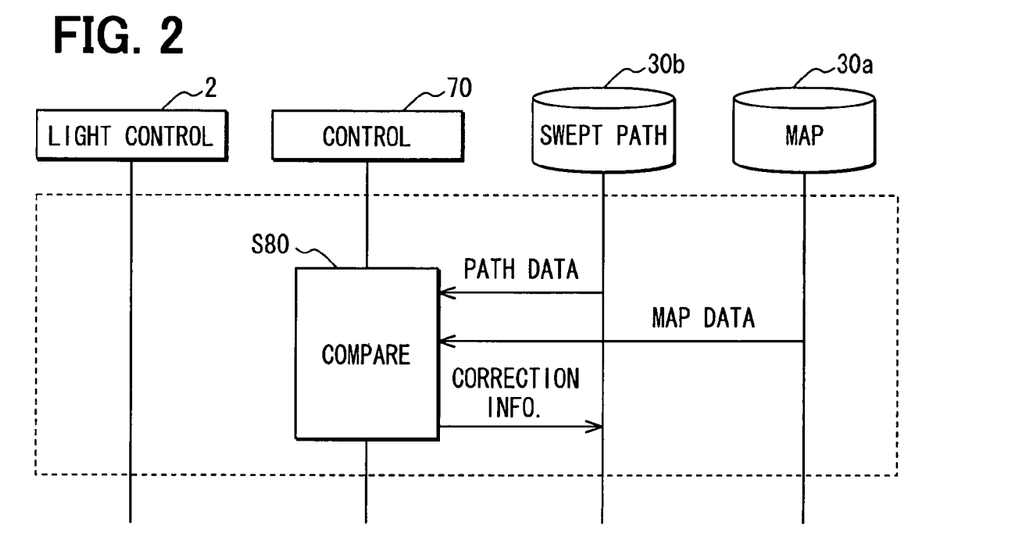
FIG. 2 is a flowchart illustrating the processing of computing correction information indicating an amount of deviation between electronic map data and vehicular swept path data, carried out by a control unit.

When the in-vehicle automobile navigation system is brought into an operational state, the control unit 70 periodically carries out the processing illustrated in FIG. 2.

The control unit 70 acquires vehicular swept path data from the vehicular swept path database 30b and electronic map data from the electronic map database 30a, and compares the vehicular swept path data with the electronic map data (S80). Thus, the control unit computes correction information representing the amount of deviation between the vehicular swept path data and the electronic map data.

Figure 3:
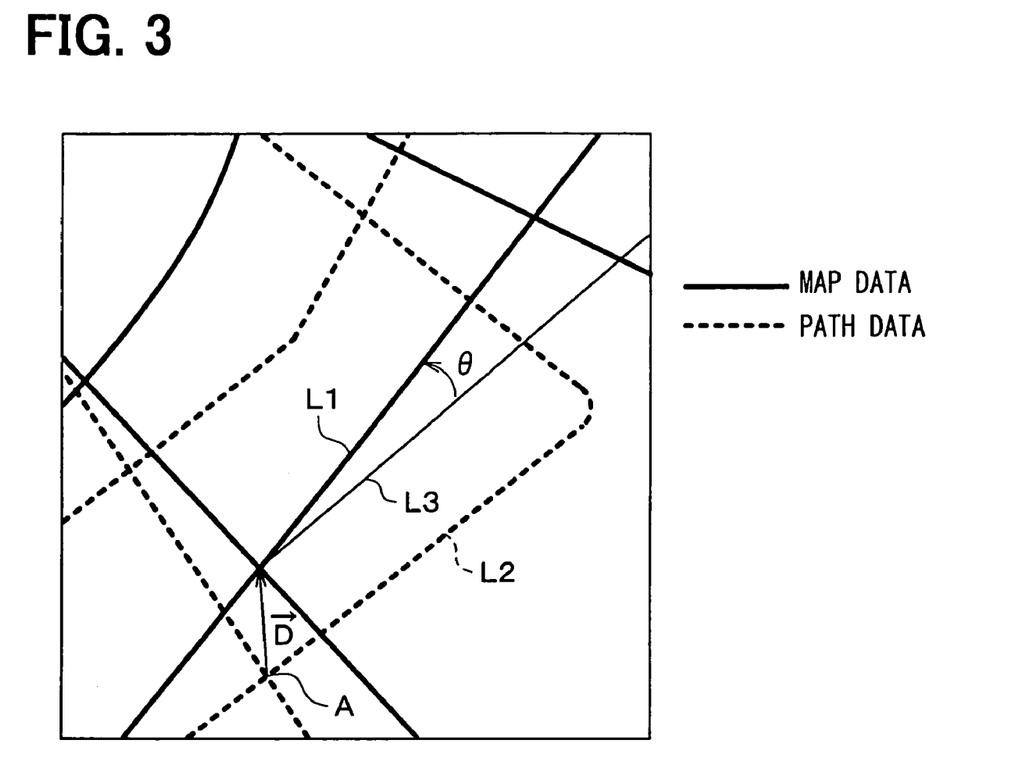
FIG. 3 is a drawing for explaining how to determine an offset correction amount $\vec{D}$ and a rotation correction amount $\theta$.

FIG. 3 illustrates how to obtain correction information representing the amount of deviation between vehicular swept path data and electronic map data. In this embodiment, an offset correction amount $\vec{D}$ and a rotation correction amount θ are computed as correction information. The offset correction amount $\vec{D}$ represents a movement vector (the magnitude of movement and the direction of movement) by which a specific point A contained in vehicular swept path data is pulled onto a road contained in electronic map data in map matching. The rotation correction amount θ represents the angle formed by a vehicular swept path line L1 determined from multiple plot points contained in vehicular swept path data and a road L2 contained in electronic map data corresponding to that vehicular swept path line. The rotation correction amount θ in the drawing is depicted as the angle formed by a line L3 parallel with the road L2 and the vehicular swept path line L1.

The control unit 70 stores the thus computed correction information in the vehicular swept path database 30b in correlation with a corresponding mesh.

The control unit 70 carries out the processing of providing corrected electronic map data obtained by correcting the electronic map database 30a using correction information stored in the vehicular swept path database 30b as mentioned above.

A description will be given of the processing of providing corrected electronic map data obtained by correcting the electronic map database 30a using correction information, carried out by the control unit 70, with reference to FIG. 4. When there is a request for map data from the light control unit 2, the control unit 70 carries out the processing illustrated in FIG. 4.

First, the control unit 70 determines whether or not vehicular swept path data exists in the mesh (present location area) corresponding to the area (i.e., current position) where the vehicle is positioned (S100). Specifically, the control unit 70 determines whether or not vehicular swept path data exists in the mesh corresponding to the area where the vehicle is positioned based on the following: based on whether or not the vehicular swept path data of the mesh corresponding to the current position, computed through relevant vehicle position computation processing, exists in the vehicular swept path database 30b.

When the vehicular swept path data of the mesh corresponding to the area where the vehicle is positioned exists in the vehicular swept path database 30b, affirmative determination is made at S100. Then, the control unit 70 determines whether or not the reliability of the vehicular swept path data is equal to or higher than the reliability of the electronic map data (S102).

When the reliability of the vehicular swept path data is equal to or higher than the reliability of the electronic map data, affirmative determination is made at S102. Then, the control unit acquires the correction information of the mesh corresponding to the current position from the vehicular swept path database 30b (S104).

Then, the control unit corrects the electronic map data with the acquired correction information (S106). Specifically, the control unit carries out the following processing to correct the electronic map data: it reads the electronic map data of the mesh corresponding to the current position from the electronic map database 30a; it rotates the electronic map data by an amount equivalent to the rotation correction amount θ contained in the correction information in the opposite direction; and it moves the data by an amount equivalent to the offset correction amount $\vec{D}$ (vector quantity having a magnitude and a direction) contained in the correction information in the opposite direction.

Then, the control unit 70 presents the electronic map data obtained as the result of the correction carried out at S106 (S108). That is, the electronic map data corrected using the correction information is provided to the light control unit 2.

When the vehicular swept path data of the mesh corresponding to the area where the vehicle is positioned does not exist in the vehicular swept path database 30b, negative determination is made at S100. Then, the control unit 70 determines whether or not the reliability of the electronic map data is lower than a predetermined reference value (S112).

When the reliability of the electronic map data is equal to or higher than the predetermined reference value, negative determination is made at S112, and the flow proceeds to S110. That is, the electronic map data is provided to the light control unit 2.

When the reliability of the vehicular swept path data is lower than the reliability of the electronic map data, negative determination is made at S102, and the flow proceeds to S110. That is, the electronic map data is provided to the light control unit 2.

When the vehicle position is located in the mesh corresponding to an area where it has not run in the past, there is no vehicular swept path data in the vehicular swept path database 30b. Therefore, the correction information of the mesh corresponding to the area where the vehicle is positioned cannot be acquired from the vehicular swept path database 30b.

When the vehicular swept path data of the mesh corresponding to the area where the vehicle is positioned does not exist in the vehicular swept path database 30b and the reliability of the electronic map data is lower than the predetermined reference value, the control unit 70 in this embodiment carries out the following processing: it defines the correction information of the mesh corresponding to the area where the vehicle is positioned by interpolation using the correction information of areas (meshes) present nearby and having correction information; and it corrects the electronic map data using the correction information defined by this interpolation (S114 to S120).

At S114, the control unit selects three nearby areas having correction information. Specifically, it refers to the vehicular swept path database 30b, and selects three nearby areas having correction information with respect to the current position z(x, y) of the vehicle illustrated in FIG. 5. Here, z0(x0, y0), z1(x1, y1), and z2(x2, y2) shown in FIG. 5 are the coordinates of the centers of three nearby areas having correction information.

Figure 5:
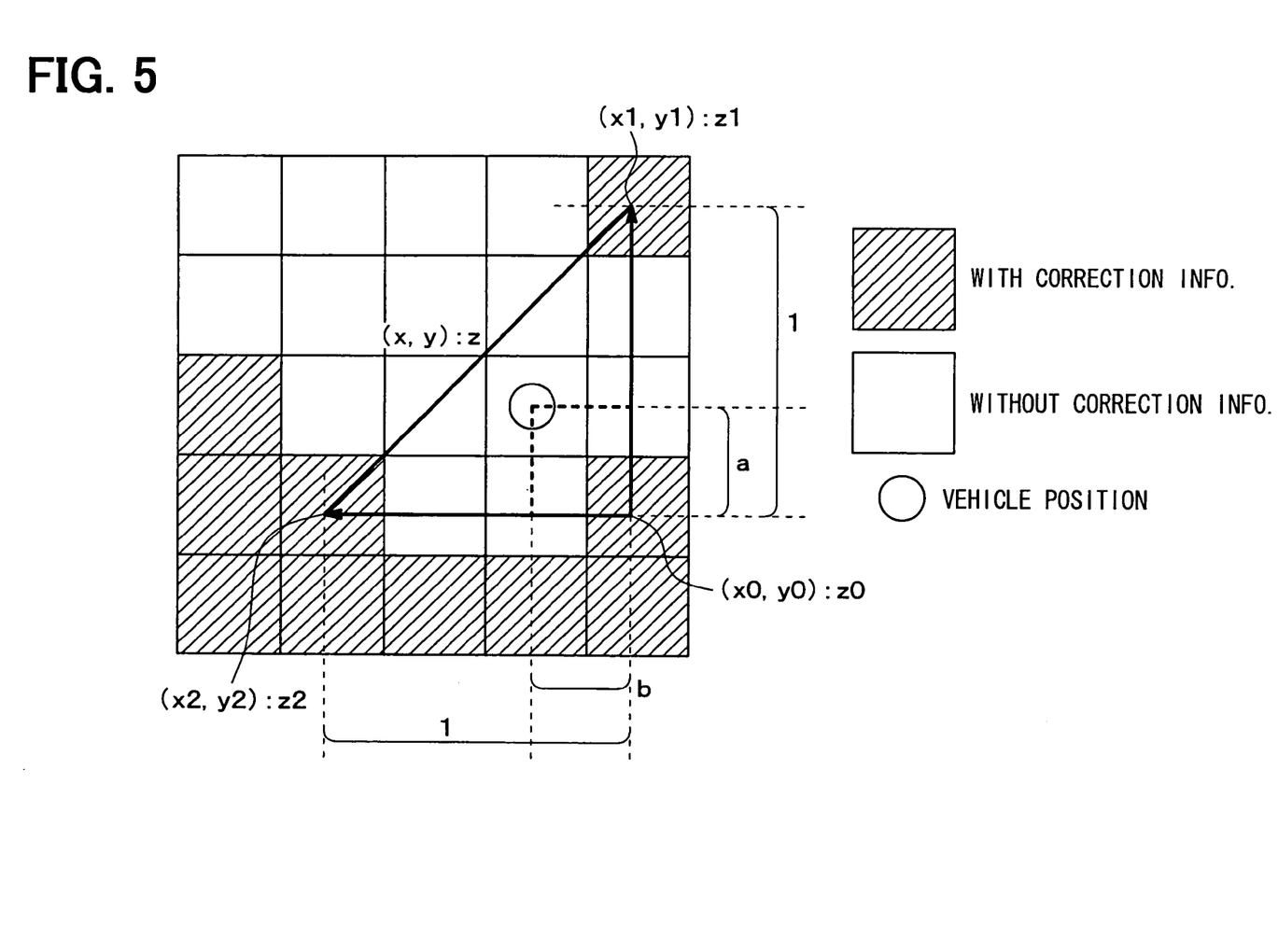
FIG. 5 is a drawing for explaining interpolation of correction information.

At this time, the current position z(x, y) of the vehicle is expressed by Expressions 1 and 2 using a and b (where, a<1, b<1) that represent the ratio of the measures of the three sides of a triangle having apexes represented as z0, z1, and z2, illustrated in FIG. 5.

$$x = x0 + a(x1-x0) + b(x2-x0) \quad \text{Expression 1}$$

$$y = y0 + a(y1-y0) + b(y2-y0) \quad \text{Expression 2}$$

Here, correction parameters for the current position z(x, y) of the vehicle can be derived from the found parameters a and b.

However, when the areas selected at S114 are remote, it may be impossible to accurately interpolate their correction information to obtain the correction information of the mesh corresponding to the area where the relevant vehicle is positioned.

To cope with this, at S116, the control unit 70 carries out area determination to determine whether or not the selected areas exist within a predetermined range (S116). Specifically, it carries out area determination based on whether or not Expressions 3 to 5 are satisfied using a threshold value k.

$$-k \leq a \leq 1+k \quad \text{Expression 3}$$

$$-k \leq b \leq 1+k \quad \text{Expression 4}$$

$$-k \leq a+b \leq 1+k \quad \text{Expression 5}$$

Figure 6:
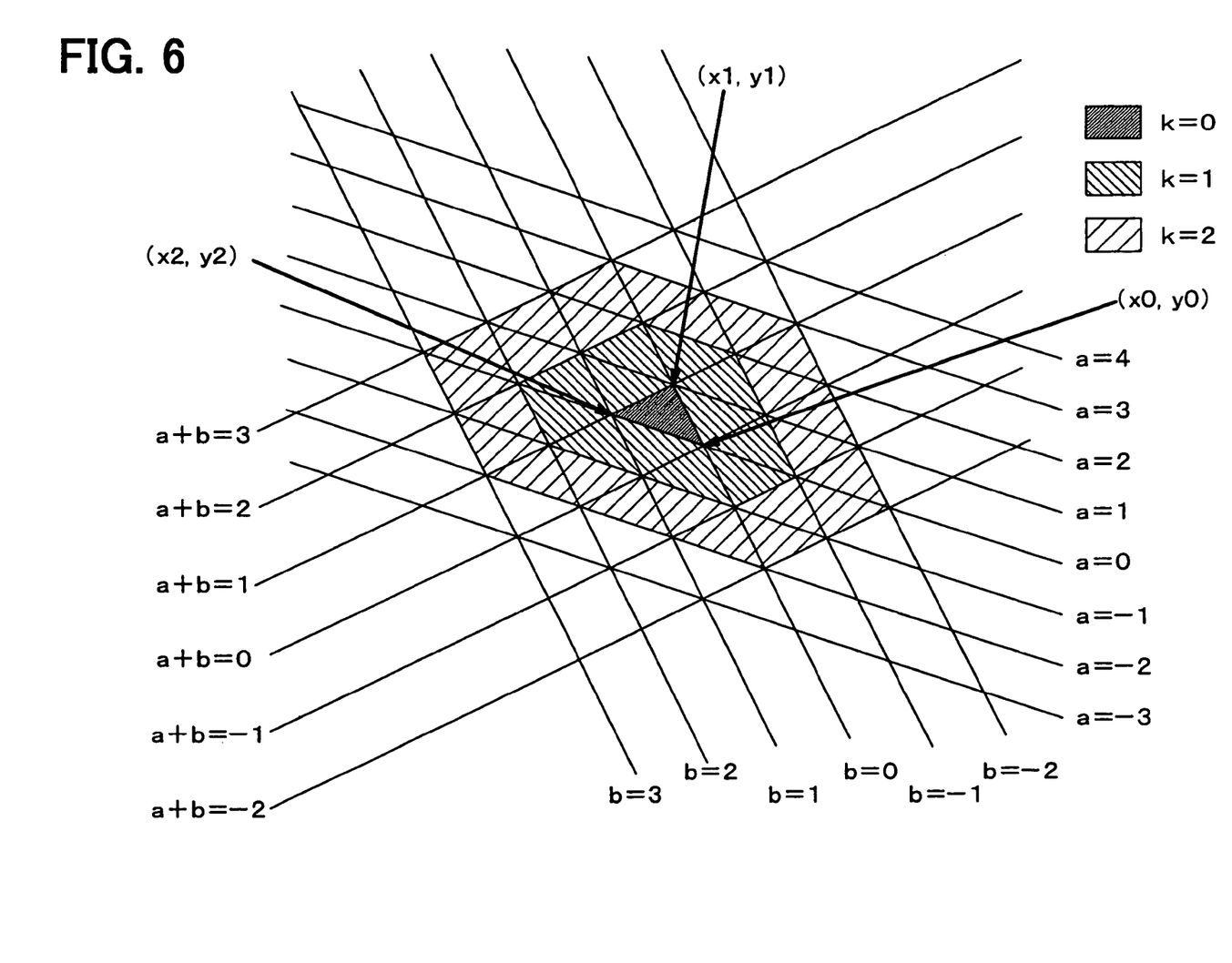
FIG. 6 is a drawing for explaining area determination with respect to three nearby areas having correction information.

FIG. 6 shows the ranges of area selection defined when 0, 1, and 2 are taken as the threshold value k. With a small value set to the threshold value k, as illustrated in FIG. 6, the range of area selection is narrowed and interpolation can become impossible in this case. With a large value set to the threshold value k, the range of area selection is widened but a situation in which correction information cannot be accurately interpolated more frequently occurs. In this embodiment, an appropriate threshold value k is set with the foregoing taken into account.

When it is determined at S116 that the selected areas do not exist in the predetermined range, the flow proceeds to S110. That is, the electronic map data is provided to the light control unit 2.

When it is determined at S116 that the selected areas exist in the predetermined range, the correction information of the three nearby areas is interpolated to obtain correction information (S118). Specifically, using the correction information of the three nearby areas, correction information for the current position of the vehicle is defined by interpolation.

Letting the offset correction amounts for z0, z1, and z2 be respectively $\vec{d}0$, $\vec{d}1$, and $\vec{d}2$, the offset correction amount $\vec{d}$ for the current position z(x, y) of the vehicle is expressed by Expression 6. Here, each of $\vec{d}$, $\vec{d}0$, $\vec{d}1$, and $\vec{d}2$ is a vector quantity having a magnitude and a direction.

$$\vec{d} = \vec{d}0 + a(\vec{d}1 - \vec{d}0) + b(\vec{d}2 - \vec{d}0) \quad \text{Expression 6}$$

Letting the rotation correction amounts for z0, z1, and z2 be respectively θ0, θ1, and θ2, the rotation correction amount θ for the current position z(x, y) of the vehicle is expressed by Expression 7.

$$\theta = \theta 0 + a(\theta 1 - \theta 0) + b(\theta 2 - \theta 0) \quad \text{Expression 7}$$

Thus, the correction information for the current position of the vehicle is defined from the correction information of the three nearby areas.

Then, the electronic map data is corrected with the correction information obtained by interpolation (S120), similarly at the processing of S106. That is, using the correction information for the current position of the vehicle, defined at S118, the electronic map data is rotated by an amount equivalent to the rotation correction amount θ contained in the correction information in the opposite direction, and it is moved by an amount equivalent to the offset correction amount $\vec{D}$ (vector quantity having a magnitude and a direction) contained in the correction information in the opposite direction.

The control unit presents the corrected electronic map data to the light control unit 2 (S122), and terminates this processing. Thus, the electronic map data corrected with the correction information obtained by interpolation is provided to the light control unit 2.

With the above-mentioned construction, correction information that represents the amount of deviation of electronic map data from vehicular swept path data is computed on a mesh-by-mesh basis, and electronic map data corrected using this correction information is provided. Therefore, more accurate map data can be provided.

Further, it is possible to compute an offset correction amount and a rotation correction amount as correction information and correct electronic map data using this correction information.

When the reliability of vehicular swept path data is lower than the reliability of electronic map data, the following problem arises: if electronic map data is corrected using correction information that represents the amount of deviation of electronic map data from vehicular swept path data, the accuracy of map data can be degraded on the contrary. To cope with this, the following processing is carried out in this embodiment: only when it is determined that the reliability of vehicular swept path data is equal to or higher than the reliability of electronic map data, the vehicular swept path data and the electronic map data is compared with each other to compute the correction information of each mesh; and electronic map data corrected using this correction information is provided. Therefore, a situation in which the accuracy of map data is degraded by correction can be eliminated.

Vehicular swept path data and electronic map data can be compared with each other for reliability based on the following: the reliability of vehicular swept path data defined using information indicating the distribution of GPS satellites, contained in radio waves transmitted from the GPS satellites; and the reliability of electronic map data defined using plane position standard deviation indicating an error in plane position observed during surveying for electronic map data, contained in that electronic map data.

When it is determined that a vehicular swept path corresponding to the absolute position of the vehicle is not contained in vehicular swept path data and it is determined that the reliability of electronic map data is lower than a predetermined reference value, the following processing is carried out in this embodiment: three or more meshes that exit around the absolute position of the vehicle and have correction information are selected; the correction information of the selected areas is interpolated to obtain correction information; and electronic map data corrected with the correction information obtained by this interpolation is provided. Therefore, even though a vehicular swept path corresponding to the absolute position of the vehicle does not exist in vehicular swept path data, the following can be implemented when the reliability of electronic map data is lower than a predetermined reference value: electronic map data corrected using correction information obtained by interpolation can be provided. When the reliability of electronic map data is higher than a predetermined reference value, electronic map data can be prevented from being corrected using correction information.

When points at which correction information for interpolation was stored are remote from the absolute position of the vehicle, it can be impossible to accurately interpolate the correction information. To cope with this, the following processing is carried out in this embodiment: it is determined whether or not selected meshes exist in a predetermined range relative to the absolute position of the vehicle; and when it is determined that the selected meshes exist in the predetermined range relative to the absolute position of the vehicle, the correction information of the selected meshes is interpolated to obtain correction information for the absolute position of the vehicle. Therefore, correction information of points remote from the absolute position of the vehicle can be prevented from being interpolated to obtain correction information for the absolute position of the vehicle.

Second Embodiment

The description of the first embodiment takes up as an example a case where the following processing is carried out: electronic map data and vehicular swept path data are compared with each other to compute correction information that represents the amount of deviation between the electronic map data and the vehicular swept path data; electronic map data is corrected using the computed correction information; and the corrected electronic map data is presented to the light control unit 2. The second embodiment is so constructed that the following processing is carried out so that correction information computed at the automobile navigation system 1 of each vehicle can also be used at the automobile navigation systems 1 of other vehicles: the automobile navigation system 1 of each vehicle is caused to transmit correction information to a central facility 3; these pieces of correction information are accumulated at the central facility 3; and the accumulated correction information is provided in response to a request from each automobile navigation system 1.

Figure 7:
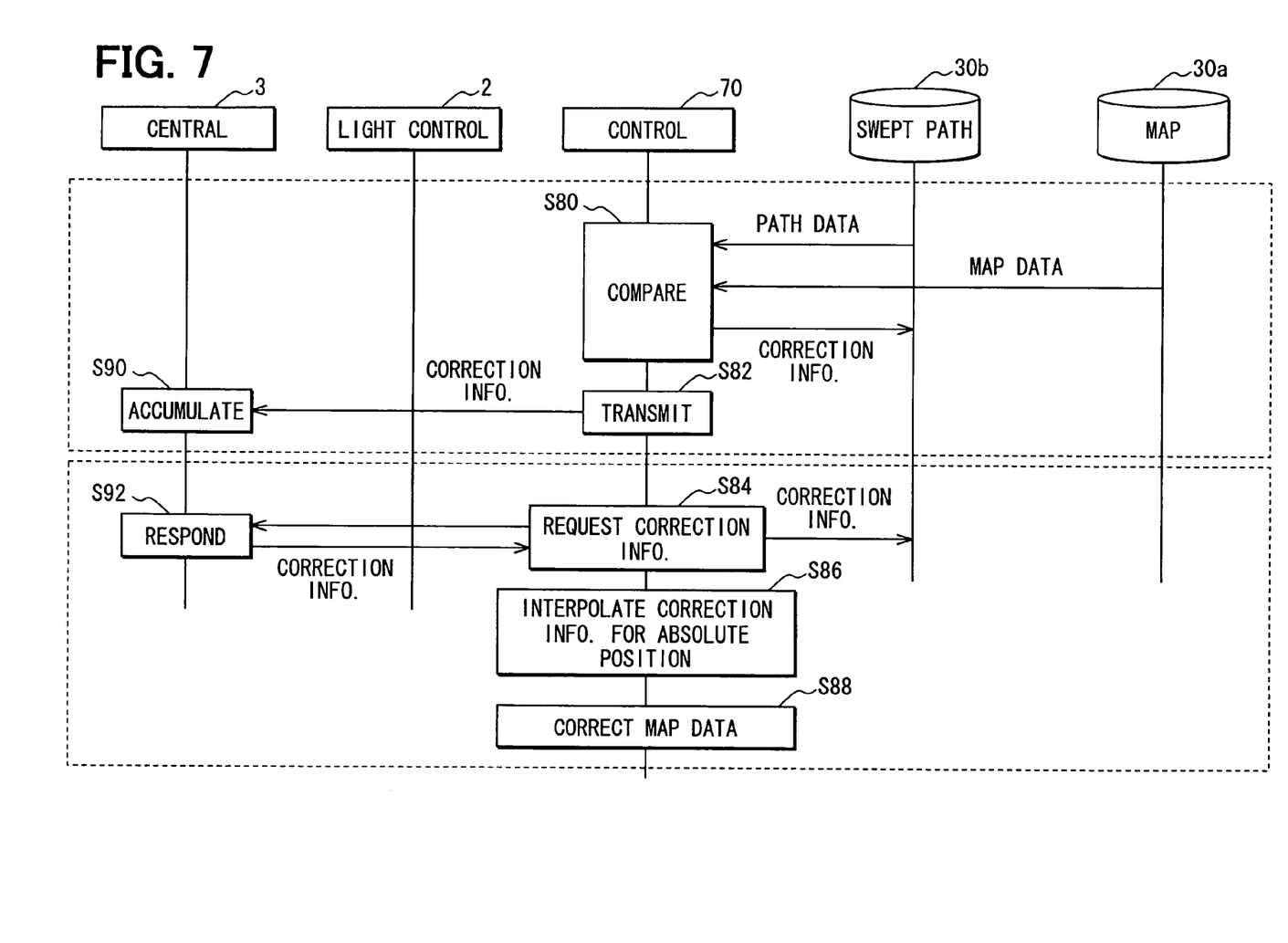
FIG. 7 is a flowchart illustrating the processing carried out between a control unit and a central facility in a second embodiment.

A description will be given of the processing carried out between a control unit 70 and the central facility 3 in this embodiment with reference to FIG. 7.

As in the processing illustrated in FIG. 2, the control unit 70 carries out the following processing: it acquires vehicular swept path data from the vehicular swept path database 30*b* and electronic map data from the electronic map database 30*a*, and compares the vehicular swept path data with the electronic map data (S80); then, it computes correction information that represents the amount of deviation between the vehicular swept path data and the electronic map data.

Thereafter, the control unit transmits the computed correction information to the central facility 3 (S82). Specifically, it transmits the information to the central facility 3 through the communication unit 10 by radio. Thus, correction information is transmitted from the automobile navigation system 1 mounted in each vehicle to the central facility 3.

When the central facility 3 receives correction information transmitted from the automobile navigation system 1 mounted in each vehicle, it accumulates the received correction information on a storage medium on a mesh-by-mesh basis (S90).

When the control unit 70 of an automobile navigation system 1 in this embodiment determines that there is not correction information in nearby areas, it requests the correction information of nearby areas from the central facility 3 (S82).

When there is a request for the correction information of nearby areas from the automobile navigation system 1, the central facility 3 transmits the correction information of nearby areas to the automobile navigation system 1 in response to this request (S92).

Figure 4:
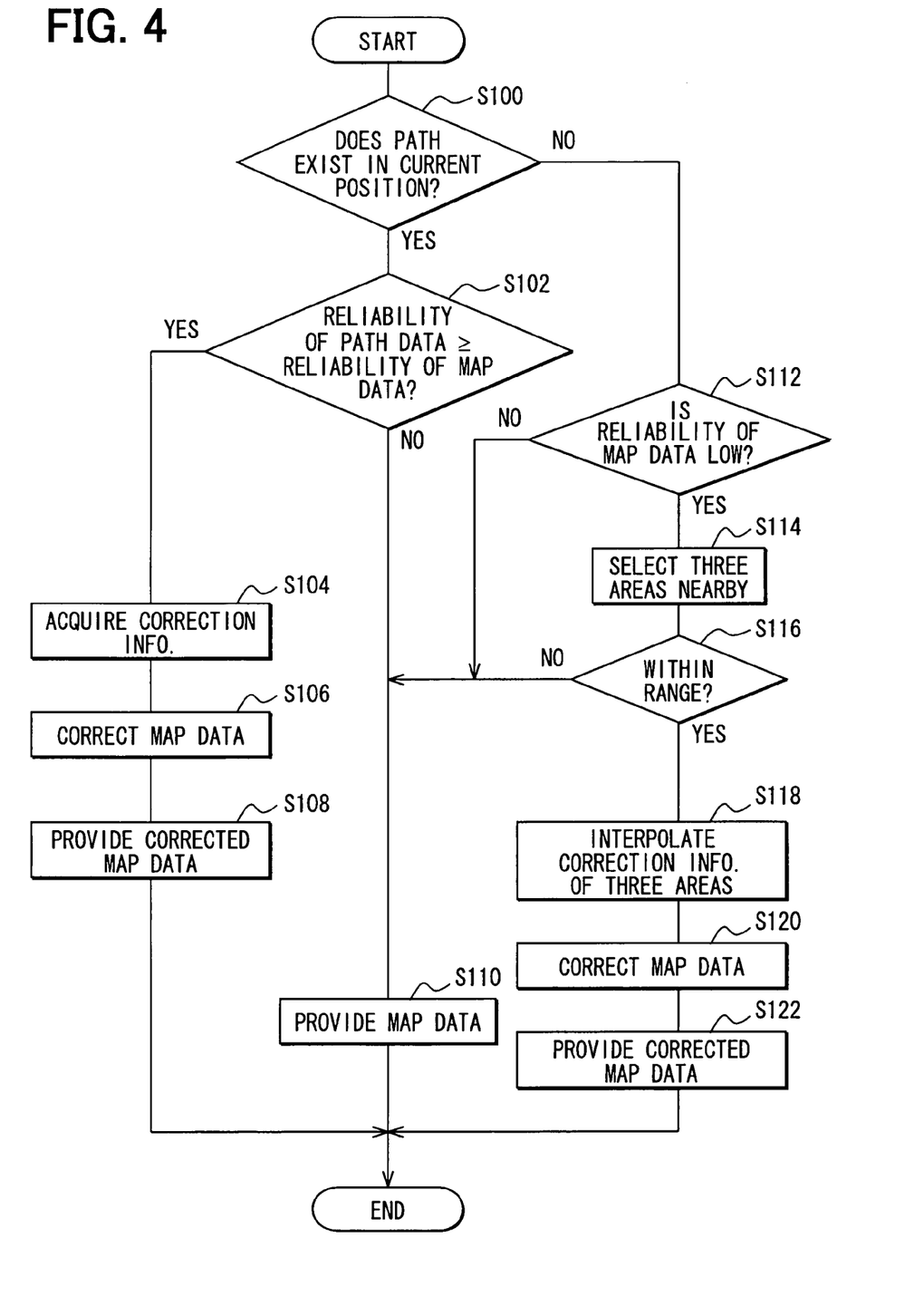
FIG. 4 is a flowchart illustrating the processing of providing corrected electronic map data, carried out by a control unit.

The control unit 70 of the automobile navigation system 1 carries out the processing of S118 to S122 in FIG. 4 using this correction information of the nearby areas transmitted from the central facility 3. That is, it obtains the correction information for the absolute position of the vehicle by interpolation (S86), corrects the electronic map data using the correction information obtained by this interpolation (S88), and provides the corrected electronic map data.

Figure 8:
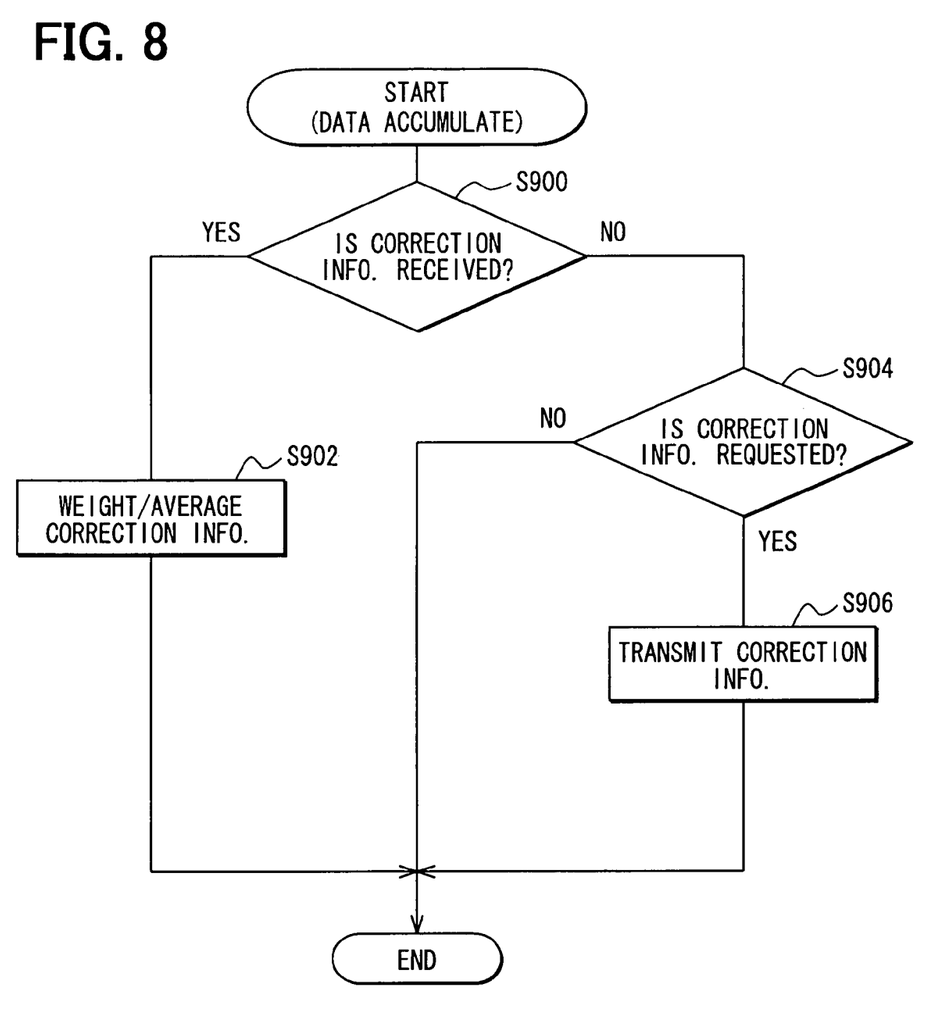
FIG. 8 is a flowchart illustrating the accumulated data processing carried out at a central facility.

A description will be given of the processing (S90, S92) carried out at the central facility 3 with reference to FIG. 8. The central facility 3 periodically carries out the processing illustrated in FIG. 8.

First, it is determined whether or not correction information has been received (S900). When correction information has been received, the processing of weighting the received correction information using reliability and averaging correction values is carried out (S902). A specific description will be given. Letting a received correction value be $\vec{d}$, reliability be p, the accumulated correction value of the relevant mesh (the value of already accumulated correction information) be $\vec{D}$, and accumulated reliability (already accumulated reliability) be P, the accumulated correction value $\vec{D}$ and the accumulated reliability P can be respectively weighted and averaged as $\vec{D}=(\vec{D}P+\vec{d}p)/(p+P)$, and $P=(p+P)$.

Thus, the processing of weighting correction information transmitted from the automobile navigation system 1 of each vehicle by reliability and averaging it is periodically carried out.

When correction information has not been received, negative determination is made at S900, and it is determined whether or not a correction information request has been received (S904).

When a correction information request has not been received, negative determination is made at S904, and this processing is terminated.

When it is determined by the control unit 70 of the automobile navigation system 1 that there is not correction information in nearby areas and a request for the correction information of nearby areas has been received from the control unit 70, affirmative determination is made at S904. Then the accumulated correction value $\vec{D}$ and accumulated reliability P of the relevant mesh are transmitted to the automobile navigation system 1 that requested correction information (S906), and this processing is terminated.

As mentioned above, the control unit 70 of the automobile navigation system 1 can carry out the following processing: it can transmit computed correction information to the central facility 3; it can request the correction information of nearby areas from the central facility 3 at which correction information is accumulated; it can obtain the correction information for the absolute position of the vehicle by interpolation using the correction information transmitted from the central facility 3; it can correct electronic map data using the correction information obtained by this interpolation; and it can provide the corrected electronic map data. That is, the control unit can request correction information from the central facility 3 at which correction information computed at other vehicles is accumulated, and correct electronic map data using the correction information transmitted from the central facility 3.

Other Embodiments

In the description of the above embodiments, a case where map data is provided to the light control unit 2 is taken up as an example. However, the invention is not limited to a light control unit 2 and it can be applied to various in-vehicle units that operate using map data.

In the description of the above embodiments, a case where correction information is computed on a mesh-by-mesh basis and map data obtained by correcting electronic map data using the thus computed correction information is taken up as an example. However, correction information need not be computed on a mesh-by-mesh basis and may be computed with respect to each block other than mesh.

In the description of the above embodiments, a case where vehicular swept path data and electronic map data are compared with each other for reliability based on the following is taken up as an example: the reliability of vehicular swept path data defined using HDOP information contained in radio waves transmitted from GPS satellites; and the reliability of electronic map data defined using plane position standard deviation observed during surveying for electronic map data, contained in the electronic map data. The defining of reliability described here is just an example, and any other condition can be used to define reliability.

The description of the above embodiments takes up as an example a case where the processing of selecting three nearby areas having correction information is carried out at S114 on the following occasion: when it is determined at S100 that there is not vehicular swept path data in the mesh (present location area) corresponding to the area where the vehicle is positioned and it is determined at S112 that the reliability of electronic map data is lower than a predetermined reference value. Instead, when it is determined at S100 that there is not vehicular swept path data in the mesh (present location area) corresponding to the area where the vehicle is positioned, the processing of selecting three nearby areas having correction information may be carried out at S114.

The description of the above embodiments takes up as an example a case where the following processing is carried out: at S114, three blocks (points) that exist around the absolute position of the vehicle and have correction information are selected; the correction information of the selected blocks is interpolated to obtain correction information; and electronic map data corrected using the correction information obtained by this interpolation is provided. Instead, the following processing may be carried out: four or more points (blocks) are selected; the correction information of the selected blocks is interpolated to obtain correction information; and electronic map data corrected using the correction information obtained by this interpolation is provided.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A map data providing device in a vehicle, comprising:
a vehicle position detecting unit configured to detect an absolute position of the vehicle;
a storing unit configured to store absolute positions of the vehicle detected by the vehicle position detecting unit while the vehicle runs as vehicular swept path data pertaining to the vehicle;
a correction information computing unit configured to compare the vehicular swept path data with electronic map data representing a road map and compute correction information representing an amount of deviation of the electronic map data from the vehicular swept path data with respect to an area where the vehicle is positioned;
a first correcting unit configured to correct the electronic map data using the correction information computed by the correction information computing unit; and
a first map data providing unit configured to provide the electronic map data corrected by the first correcting unit, wherein
the correction information computing unit computes, as the correction information, an offset correction amount and a rotation correction amount,
the offset correction amount representing a movement vector by which, in map matching, a specific point contained in the vehicular swept path data is pulled onto a road contained in the electronic map data,
the rotation correction amount representing an angle formed by (i) a vehicular swept path line obtained from the vehicular swept path data and (ii) a road contained in the electronic map data corresponding to the vehicular swept path line; and
the first correcting unit corrects the electronic map data using the offset correction amount and the rotation correction amount.

2. The map data providing device of claim 1, comprising:
a first determining unit configured to determine whether a swept path reliability, which is a reliability of the vehicular swept path data, is equal to or higher than a map reliability, which is a reliability of the electronic map data,
wherein when it is determined by the first determining unit that the swept path reliability is equal to or higher than the map reliability, the correction information computing unit compares the vehicular swept path data with the electronic map data to compute the correction information of the area, the first correcting unit corrects the electronic map data using the correction information, and the first map data providing unit provides the corrected electronic map data.

3. The map data providing device of claim 2,
wherein the vehicle position detecting unit detects the absolute position by receiving radio waves transmitted from GPS satellites, and
wherein the first determining unit determines whether the swept path reliability is equal to or higher than the map reliability, wherein the swept path reliability is defined using information indicating a distribution of the GPS satellites contained in the received radio waves, wherein the map reliability is defined using plane position standard deviation that represents an error in plane position observed during surveying for the electronic map data.

4. The map data providing device of claim 3, cooperating with a light control unit controlling a change of a direction of a light axis of a headlamp in the vehicle, wherein
when it is determined by the first determining unit that the swept path reliability is equal to or higher than the map reliability,
the light control unit controls the change of the direction of the light axis of the headlamp, based on the electronic map data, which is corrected by the first correcting unit and then provided by the first map data providing unit.

5. The map data providing device of claim 1, comprising:
an area selecting unit configured to select three or more different areas that exist around the absolute position of the vehicle and have the correction information;
an interpolating unit configured to interpolate the correction information of the different areas selected by the area selecting unit to obtain the correction information for the absolute position of the vehicle;
a second correcting unit configured to correct electronic map data using the correction information obtained by interpolating by the interpolating unit; and
a second map data providing unit configured to provide the electronic map data corrected by the second correcting unit.

6. The map data providing device of claim 5, comprising:
a second determining unit configured to determine whether a reliability of the electronic map data is lower than a predetermined reference value, the reliability of the electronic map data being defined using plane position standard deviation that represents an error in plane position observed during surveying for the electronic map data,
wherein when it is determined by the second determining unit that the reliability of the electronic map data is lower than the predetermined reference value, the area selecting unit selects three or more different areas that exist around the absolute position of the vehicle and have the correction information.

7. The map data providing device of claim 5, comprising:
a third determining unit configured to determine whether the areas selected by the area selecting unit exist in a predetermined range relative to the absolute position of the vehicle,
wherein when it is determined by the third determining unit that the areas selected by the area selecting unit exist in the predetermined range, the interpolating unit interpolates the correction information of the areas selected by the area selecting unit to obtain the correction information for the absolute position of the vehicle.

8. The map data providing device of claim 5, comprising:
a transmitting unit configured to transmit the correction information computed by the correction information computing unit to a central facility; and
a correction information requesting unit configured to request the correction information from the central facility at which the correction information transmitted by the transmitting unit is accumulated, wherein the interpolating unit interpolates the correction information transmitted from the central facility in response to the request from the correction information requesting unit to obtain the correction information for the absolute position of the vehicle, and wherein the second correcting unit corrects the electronic map data using the correction information transmitted from the central facility in response to the request from the correction information requesting unit.

9. The map data providing device of claim 1, wherein the movement vector is defined as the magnitude of movement and the direction of movement by which a single point is pulled onto the road.

10. The map data providing device of claim 2, cooperating with a light control unit controlling a change of a direction of a light axis of a headlamp in the vehicle, wherein, when it is determined by the first determining unit that the swept path reliability is equal to or higher than the map reliability, the light control unit controls the change of the direction of the light axis of the headlamp, based on the electronic map data, which is corrected by the first correcting unit and then provided by the first map data providing unit.

11. A method for correcting map data, comprising:
detecting an absolute position of a vehicle;
storing absolute positions of the vehicle detected while the vehicle runs as vehicular swept path data pertaining to the vehicle;
comparing the vehicular swept path data with electronic map data representing a road map to thereby compute correction information representing an amount of deviation of the electronic map data from the vehicular swept path data with respect to an area where the vehicle is positioned;
correcting the electronic map data using the computed correction information; and
providing the corrected electronic map data,
wherein:
the correction information includes an offset correction amount and a rotation correction amount,
the offset correction amount representing a movement vector by which, in map matching, a specific point contained in the vehicular swept path data is pulled onto a road contained in the electronic map data,
the rotation correction amount representing an angle formed by (i) a vehicular swept path line obtained from the vehicular swept path data and (ii) a road contained in the electronic map data corresponding to the vehicular swept path line.

* * * * *